United States Patent [19]

Satake et al.

[11] Patent Number: 4,873,283

[45] Date of Patent: Oct. 10, 1989

[54] MOLDED OR FORMED POLY(ARYLENE THIOETHER-KETONE) ARTICLES

[75] Inventors: Yoshikatsu Satake; Yo Iizuka; Toshitaka Kouyama; Takayuki Katto; Zenya Shiiki, all of Iwaki, Japan

[73] Assignee: Kureha Kagaku Kogyo K.K., Tokyo, Japan

[21] Appl. No.: 194,017

[22] Filed: May 12, 1988

[30] Foreign Application Priority Data

May 15, 1987 [JP] Japan .................. 62-118620
Jul. 21, 1987 [JP] Japan .................. 62-181970
May 7, 1988 [JP] Japan .................. 63-109916

[51] Int. Cl.$^4$ ............................................. C08F 82/80
[52] U.S. Cl. ..................................... 524/520; 524/538; 524/539; 524/540; 524/592; 525/153; 525/420; 525/471; 528/222; 528/226
[58] Field of Search ............... 524/508, 592, 538, 539, 524/500, 537, 540, 520; 525/153, 471, 420; 528/222, 226

[56] References Cited

U.S. PATENT DOCUMENTS

| 4,590,104 | 5/1986 | Ziener et al. ................ 427/389.9 |
| 4,690,972 | 9/1987 | Johnson et al. ................ 525/471 |
| 4,698,415 | 10/1987 | Sinclair et al. ................ 528/226 |
| 4,716,212 | 12/1987 | Gaughan ................ 528/226 |
| 4,745,167 | 5/1988 | Iizuka et al. ................ 526/262 |

FOREIGN PATENT DOCUMENTS

| 270955 | 6/1988 | European Pat. Off. . |
| 274754 | 7/1988 | European Pat. Off. . |
| 280325 | 8/1988 | European Pat. Off. . |
| 3405523 | 8/1985 | Fed. Rep. of Germany . |
| 13347 | 7/1972 | Japan . |
| 58435 | 4/1985 | Japan . |
| 104126 | 6/1985 | Japan . |
| 221229 | 10/1986 | Japan . |

OTHER PUBLICATIONS

Indian J. Chem., vol. 21A, May 1982, pp. 501–502.
*Indian Journal of Pure and Applied Physics*, vol. 22, Apr. 1984, pp. 247–248.
*Mol. Cryst. Liq. Cryst.*, vol. 83, 1982, pp. 229–238.

Primary Examiner—Morton Foelak
Attorney, Agent, or Firm—Lowe, Price, Leblanc, Becker & Shur

[57] ABSTRACT

Disclosed herein is a molded or formed poly(arylene thioether-ketone) article made of a thermoplastic material which comprises 100 parts by weight of a melt-stable poly(arylene thioether-ketone) (PTK) and if desired, up to 100 parts by weight of at least one of thermoplastic resins and/or up to 300 parts by weight of at least one of fibrous fillers and/or least one of inorganic fillers. The PTK has predominant recurring units of the formula

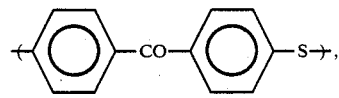

wherein the —CO— and —S— are in the para position to each other, and has a melting point, Tm of 310°–380° C., a residual melt cyrstallization enthalpy, ΔHmc (420° C./10 min) of at least 10 J/g, a melt crystallization temperature, Tmc (420° C./10 min) of at least 210° C., and a reduced viscosity of 0.2–2 dl/g as determined by viscosity measurement at 25° C. and a polymer concentration of 0.5 g/dl in 98 percent by weight sulfuric acid. This invention provides extruded articles, injection-molded articles, unstretched films and the like, all of which have practical physical properties, by using a novel high-density and high crystallinity PTK having melt stability sufficient to apply conventional melt processing techniques.

16 Claims, No Drawings

MOLDED OR FORMED POLY(ARYLENE THIOETHER-KETONE) ARTICLES

FIELD OF THE INVENTION

This invention relates to molded or formed articles comprising a melt-stable poly(arylene thioether-ketone) (hereinafter abbreviated as "PTK") having predominant recurring units of the formula

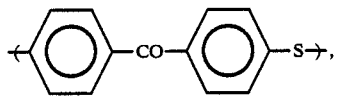

in which the —CO— and —S— are in the para position to each other, and more specifically to molded or formed articles such as injection-molded articles, extruded articles or unstretched films, which are made of the melt-stable PTK alone or a resin composition formed by adding one or more of thermoplastic resins, fibrous fillers and inorganic fillers to the PTK as needed.

BACKGROUND OF THE INVENTION

With the advance of weight-, thickness- and length-reducing technology in the field of the electronic and electric industry and with the recent advancement of weight-reducing technology in the fields of the automobile, aircraft and space industries, there has been a strong demand for crystalline thermoplastic resins having heat resistance of about 300° C. or higher and permitting easy melt processing in recent years.

As crystalline, heat-resistant, thermoplastic resins developed to date, there are, for example, poly(butylene terephthalate), polyacetal, poly(p-phenylene thioether) (PPS), etc. These resins are however unable to meet the recent requirement level for heat resistance.

Polyether ether ketones (PEEKs) and polyether ketones (PEKs) have recently been developed as heat-resistant resins having a melting point of about 300° C. or higher. These resins are crystalline thermoplastic resins. It has therefore been known that conventional melt processing techniques such as extrusion, injection molding and melt spinning can be applied to easily form them into various molded and formed articles such as extruded articles, injection-molded articles, fibers and films. These resins however use expensive fluorine-substituted aromatic compounds such as 4,4'-difluorobenzophenone as their raw materials. Limitations are thus said to exist to the reduction of their costs. It is also pointed out that these resins involve a problem in expanding their consumption.

Based on an assumption that PTKs could be promising candidates for heat-resistant thermoplastic resins like PEEKs and PEKs owing to their similarity in chemical structure, PTKs have been studied to some extent to date. There are some disclosure on PTKs, for example, in Japanese Patent Laid-Open No. 58435/1985 (hereinafter abbreviated as "Publication A"), German Offenlegungsschrift No. 34 05 523A1 (hereinafter abbreviated as "Publication B"), Japanese Patent Laid-Open No. 104126/1985 (hereinafter abbreviated as "Publication C"), Japanese Patent Laid-Open No. 13347/1972 (hereinafter abbreviated as "Publication D"), Indian J. Chem., 21A, 501–502 (May, 1982) (hereinafter abbreviated as "Publication E"), and Japanese Patent Laid-Open No. 221229/1986 (hereinafter abbreviated as "Publication F").

Regarding the PTKs described in the above publications, neither molding nor forming has however succeeded to date in accordance with conventional melt processing techniques. Incidentally, the term "conventional melt processing techniques" as used herein means usual melt processing techniques for thermoplastic resins, such as extrusion, injection molding and melt spinning.

The unsuccessful molding or forming of PTKs by conventional melt processing techniques is believed to be attributed to the poor melt stability of the prior art PTKs, which tended to lose their crystallinity or to undergo crosslinking and/or carbonization, resulting in a rapid increase in melt viscosity, upon their melt processing.

It was attempted to produce some molded or formed articles in Publications A and B. Since the PTKs had poor melt stability, certain specified types of molded or formed article were only obtained by a special molding or forming process, where PTKs were used only as a sort of binder, being impregnated into a great deal of reinforcing fibers of main structural materials and molded or formed under pressure.

Since the conventional PTKs are all insufficient in melt stability as described above, it has been unable to obtain molded or formed articles by applying conventional melt processing techniques.

OBJECTS AND SUMMARY OF THE INVENTION

An object of this invention is to overcome the above-mentioned drawbacks of the prior art PTKs and hence to provide molded or formed articles excellent in heat resistance and strength by using a novel melt-stable PTK which permits easy application of conventional melt processing techniques.

Another object of this invention is to provide molded or formed articles having high heat resistance and strength, such as injection-molded articles, extruded articles and unstretched films, from a thermoplastic material composed of a melt-stable PTK alone or a resin composition, which is obtained by mixing the melt-stable PTK with one or more of thermoplastic resins, fibrous fillers and inorganic fillers as desired, by conventional melt processing techniques.

First of all, the present inventors have chosen economical dichlorobenzophenone and/or dibromobenzophenone as a raw material without employing any expensive fluorine-substituted aromatic compound. In addition, a polymerization process was designed in an attempt to conduct polymerization by increasing the water content in the polymerization system to an extremely high level compared to processes reported previously, adding a polymerization aid and suitably controlling the profile of the polymerization temperature. As a result, it has been found that the above process can afford high molecular-weight PTKs economically. The PTKs obtained by the above new process were however still dissatisfactory in melt stability. Thus, the present inventors made further improvements to the polymerization process. It was then revealed that melt-stable PTKs, which permitted the application of conventional melt processing techniques, could be obtained by conducting polymerization without addition of any polymerization aid while paying attention to the selection of a charge ratio of monomers, the shortening of the polymerization time at high temperatures, the selection of a material for a polymerization reactor, etc. and if necessary, by conducting a stabilization treatment in a final stage of the polymerization. It was also found that molded and formed articles such as injection-molded articles, extruded articles and unstretched films could be obtained easily from such melt-stable PTKs by conventional melt-processing techniques.

These findings have led to the completion of the present invention.

In one aspect of this invention, there is thus provided a molded or formed poly(arylene thioetherketone) article made of a thermoplastic material which comprises:
(A) 100 parts by weight of a melt-stable poly(arylene thioether-ketone) having predominant recurring units of the formula

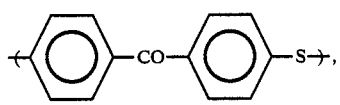

wherein the —CO— and —S— are in the para position to each other, and having the following physical properties (a)-(c):
 (a) melting point, Tm being 310°–380° C.;
 (b) residual melt crystallization enthalpy, ΔHmc (420° C./10 min) being at least 10 J/g, and melt crystallization temperature, Tmc (420° C./10 min) being at least 210° C., wherein ΔHmc (420° C./10 min) and Tmc (420° C./10 min) are determined by a differential scanning calorimeter (hereinafter referred to as "DSC") at a cooling rate of 10° C./min, after the poly(arylene thioether-ketone) is held at 50° C. for 5 minutes in an inert gas atmosphere, heated to 420° C. at a rate of 75° C./min and then held for 10 minutes at 420° C.; and
 (c) reduced viscosity being 0.2–2 dl/g as determined by viscosity measurement at 25° C. and a polymer concentration of 0.5 g/dl in 98 percent by weight sulfuric acid; and optionally,
(B) up to 100 parts by weight of at least one of thermoplastic resins and/or up to 300 parts by weight of at least one of fibrous fillers and/or at least one of inorganic fillers.

Therefore, the present invention can economically provide various heat-resistant molded and formed articles having practical physical properties, such as extruded articles, injection-molded articles and unstretched films, by using a PTK which has melt stability sufficient to apply conventional melt processing techniques and also a high molecular weight.

DETAILED DESCRIPTION OF THE INVENTION

Features of the present invention will hereinafter be described in detail.

Chemical Structure of PTKs

The melt-stable PTKs useful in the practice of this invention are poly(arylene thioether-ketones) (PTKs) having predominant recurring units of the formula

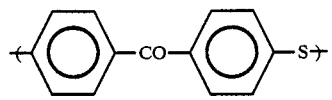

wherein the —CO— and —S— are in the para position to each other. In order to be heat-resistant polymers comparable with PEEK and PEK, the PTKs usable for the practice of this invention may preferably contain, as a main constituent, the above recurring units in a proportion greater than 50 wt. % more preferably, of 60 wt. % or higher, most preferably, of 70 wt. % or higher. If the proportion of the recurring units is 50 wt. % or less, there is a potential problem that the crystallinity of the polymer is reduced and its heat resistance is reduced correspondingly.

Exemplary recurring units other than the above recurring units may include:

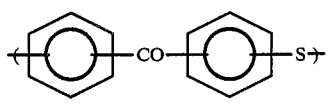

(except for the recurring unit in which the —CO— and —S— are in the para position to each other.);

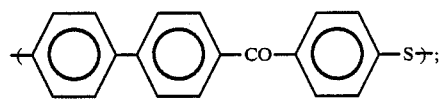

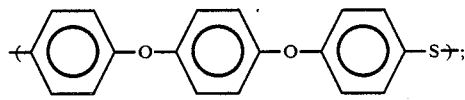

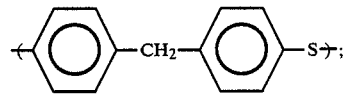

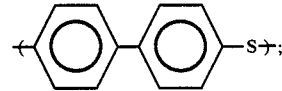

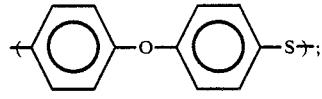

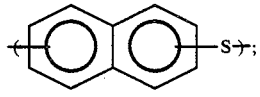

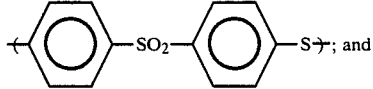

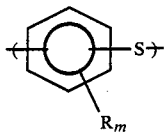

(wherein R means an alkyl group having 5 or less carbon atoms and m stands for an integer of 0-4.).

It is desirable that the melt-stable PTKs employed in this invention are uncured polymers, especially, uncured linear polymers. The term "cure" as used herein means a molecular-weight increasing treatment by a method other than a usual polycondensation reaction, for example, by a crosslinking, branching or molecular-chain extending reaction, particularly, a molecular-weight increasing treatment by a high-temperature heat treatment or the like. In general, "curing" causes a PTK to lose or decrease its melt stability and crystallinity. Curing therefore makes it difficult to employ conventional melt processing of a PTK. Even if a molded or formed article is obtained, the article tends to have a low density and reduced crystallinity, in other words, may not be regarded as "a heat-resistant molded or formed article" substantially. Curing is hence not preferred.

However, PTKs having a partially crosslinked and/or branched structure to such an extent still allowing the application of conventional melt processing techniques are still acceptable as PTKs usable in the present invention. For example, PTKs obtained by conducting polymerization in the presence of a small amount of a crosslinking agent (e.g., polychlorobenzophenone, polybromobenzophenone or the like) and PTKs subjected to mild curing can be regarded as melt-stable PTKs usable in this invention.

Physical Properties of PTKs

Summary of the physical properties:

The melt-stable PTKs useful in the practice of this invention have the following physical properties.

(a) As indices of the characteristics of heat-resistant polymers, their melting points, Tm range from 310° to 380° C.

(b) As indices of the melt stability of polymers to which conventional melt processing techniques can be applied, their residual melt crystallization enthalpies, $\Delta Hmc$ (420° C./10 min) are at least 10 J/g, and their melt crystallization temperatures, Tmc (420° C./10 min) are at least 210° C.

(c) In the case of molded and formed articles such as injection-molded articles, extruded articles and films, their shaping is difficult due to draw down or the like upon melt forming unless the molecular weight is sufficiently high. They should have a high molecular weight. As indices of the molecular weights of the polymers, their reduced viscosities, $\eta_{red}$ should be within the range of 0.2-2 dl/g. In the present invention, each reduced viscosity, $\eta_{red}$ is expressed by a value as measured at 25° C. and a polymer concentration of 0.5 g/dl in 98 percent by weight sulfuric acid as a solvent. (d) As indices of the characteristics of highly-crystalline polymers, the polymers have a density of at least 1.34 g/cm³ at 25° C. when annealed at 280° C. for 30 minutes.

Details of the Physical Properties (1) Heat resistance:

The melting point, Tm of a polymer serves as an index of the heat resistance of the polymer.

The PTKs useful in the practice of this invention have a melting point, Tm of 310°-380° C., preferably 320°-375° C., more preferably 330°-370° C. Those having a melting point, Tm lower than 310° C. are insufficient in heat resistance as heat-resistant resins comparable with PEEKs and PEKs. On the other hand, it is difficult to perform the melt processing of those having a melting point, Tm higher than 380° C. without decomposition. Such an excessively low or high melting point is undesired.

(2) Melt stability:

The greatest feature of the PTKs useful in the practice of this invention resides in that they have melt stability sufficient to permit the application of conventional melt processing techniques.

All the conventional PTKs have low melt stability and tend to lose their crystallinity or to undergo crosslinking or carbonization, resulting in a rapid increase in melt viscosity, upon their melt processing.

It is hence possible to obtain an index of the melt processability of a PTK by investigating the residual crystallinity of the PTK after holding it at an elevated temperature of its melt processing temperature or higher for a predetermined period of time. The residual crystallinity can be evaluated quantitatively in terms of melt crystallization enthalpy. Specifically, the residual melt crystallization enthalpy, $\Delta Hmc$ (420° C./10 min) and its melt crystallization temperature, Tmc (420° C./10 min) of the PTK which are determined by a DSC at a cooling rate of 10° C./min after the PTK is held at 50° C. for 5 minutes in an inert gas atmosphere, heated to 420° C. at a rate of 75° C./min and then held for 10 minutes at 420° C., can be used as measures of its melt stability. In the case of a PTK having poor melt stability, it undergoes crosslinking or the like at the above high temperature condition of 420° C. and loses its crystallinity substantially.

The melt-stable PTKs useful in the practice of this invention are polymers whose residual melt crystallization enthalpies, $\Delta Hmc$ (420° C./10 min) are preferably at least 10 J/g, more preferably at least 15 J/g, most preferably at least 20 J/g and whose melt crystallization temperatures, Tmc (420° C./10 min) are preferably at least 210° C., more preferably at least 220° C., most preferably at least 230° C.

A PTK, whose $\Delta Hmc$ (420° C./10 min) is smaller than 10 J/g or whose Tmc (420° C./10 min) is lower than 210° C., tends to lose its crystallinity or to induce a melt viscosity increase upon its melt processing, so that difficulties are encountered upon application of conventional melt processing techniques. It is hence difficult to form such a PTK into molded or formed articles.

(3) Molecular weight:

The solution viscosity, for example, reduced viscosity, $\eta_{red}$ of a polymer can be used as an index of its molecular weight.

When a PTK is subjected, for example, to extrusion or melt forming, draw down or the like may occur as a problem upon its melt processing.

Therefore, the molecular weight which is correlated directly to the melt viscosity of the PTK is also an important factor for its melt processability.

In order to apply conventional melt processing techniques, high molecular-weight PTKs whose reduced viscosities, $\eta_{red}$ are preferably 0.2-2 dl/g, more preferably 0.3-2 dl/g, most preferably 0.5-2 dl/g are desired. Since a PTK whose $\eta_{red}$ is lower than 0.2 dl/g has a low melt viscosity and high tendency of drawdown, it is difficult to apply conventional melt processing techniques. Further, the resulting molded or formed article is insufficient in mechanical properties and the like. On the other hand, a PTK whose $\eta_{red}$ exceeds 2 dl/g is very difficult in production and processing.

(4) Crystallinity:

As an index of the crystallinity of a polymer, its density is used.

The PTKs useful in the practice of this invention are desirably polymers whose densities (at 25° C.) are preferably at least 1.34 g/cm$^3$, more preferably at least 1.35 g/cm$^3$ when annealed at 280° C. for 30 minutes. Those having a density lower than 1.34 g/cm$^3$ have potential problems that they may have low crystallinity and hence insufficient heat resistance and the mechanical properties and the like of resulting molded or formed articles may also be insufficient.

In particular, PTKs crosslinked to a high degree (e.g., the PTKs described in Publication A) have been reduced in crystallinity and their densities are generally far lower than 1.34 g/cm$^3$.

Production Process of PTKs

The melt-stable PTKs useful in the practice of this invention can each be produced, for example, by polymerizing an alkali metal sulfide and a dihalogenated aromatic compound, preferably, dichlorobenzophenone and/or dibromobenzophenone, for a short period of time, in the substantial absence of a polymerization aid (a salt of a carboxylic acid, or the like), in an aprotic polar organic solvent, preferably, an organic amide solvent (including a carbamic amide or the like) and in a system having a water content far higher compared with conventionally-reported polymerization processes while controlling the temperature profile suitably, and if necessary, by choosing the material of a reactor suitably.

Namely, the melt-stable PTKs useful in the practice of this invention can each be produced suitably by polymerizing an alkali metal sulfide and a dihalogenated aromatic compound consisting principally of 4,4'-dichlorobenzophenone and/or 4,4'-dibromobenzophenone by a dehalogenation and sulfuration reaction under the following conditions (a)-(c) in an organic amide solvent.

(a) the ratio of the water content to the amount of the charged organic amide solvent being within the range of 2.5-15 (mole/kg);

(b) the ratio of the amount of the charged dihalogenated aromatic compound to the amount of the charged alkali metal sulfide being within the range of 0.95-1.2 (mole/mole); and (c) the reaction temperature being within the range of 60°-300° C. with a proviso that the reaction time at 210° C. and higher is within 10 hours.

The melt-stable PTKs can be obtained more suitably when a reactor at least a portion of which, said portion being brought into contact with the reaction mixture, is made of a titanium material.

Further, at least one halogen-substituted aromatic compound having at least one substituent group having electron-withdrawing property at least equal to —CO— group (preferably, 4,4'-dichlorobenzophenone and/or 4,4'-dibromobenzophenone employed as a monomer) may be added and reacted (as a stabilization treatment in a final stage of the polymerization) so as to obtain PTKs improved still further in melt stability.

The melt-stable PTKs employed in the present invention may preferably be uncured polymers as described above. They may however be PTKs in which a crosslinked structure and/or a branched structure has been incorporated to a certain minor extent. In order to obtain a PTK with a branched or crosslinked structure introduced therein, it is preferable to have a polyhalogenated compound, especially, a polyhalogenated benzophenone having at least three halogen atoms exist as a crosslinking agent in the polymerization reaction system in such an amount that the charge ratio of the monomeric dihalogenated aromatic compound to the polyhalogenated benzophenone ranges from 100/0 to 95/5 (mole/mole). If the charged amount of the polyhalogenated benzophenone is too much, physical properties of the resulting PTK, such as its melt processability, density and crystallinity, will be reduced. It is hence not preferable to charge such a polyhalogenated benzophenone too much.

Thermoplastic Resin

The thermoplastic material used as a raw material of a molded or formed article such as an injection-molded article, extruded article or unstretched film in this invention may be composed of the melt-stable PTK alone. In view of processability, physical properties, economy and the like, it may also a resin composition obtained by mixing at least one of thermoplastic resins in a proportion of 0-100 parts by weight, preferably 0-90 parts by weight, and more preferably 0-80 parts by weight, all, per 100 parts by weight of the PTK. It is not preferable to add the thermoplastic resins in any amount greater than 100 parts by weight, because such a high proportion results in a molded or formed article of reduced heat resistance and strength.

As exemplary thermoplastic resins, may be mentioned resins such as poly(arylene thioethers), PEEKs, PEKs, polyimides, polyamides (including Aramids), polyamideimides, polyesters (including aromatic polyesters and liquid crystalline polyesters), polysulfones, polyether sulfones, polyether imides, polyarylenes, poly(phenylene ethers), polycarbonates, polyester carbonates, polyacetals, fluoropolymers, polyolefins, polystyrenes, polymethyl methacrylate, and ABS; as well as elastomers such as fluororubbers, silicone rubbers, olefin rubbers, acrylic rubbers, polyisobutylenes (including butyl rubber), hydrogenated SBR, polyamide elastomers and polyester elastomers. These resins may be used either singly or in combination.

Among the above-exemplified thermoplastic resins, poly(arylene thioethers), especially, poly(arylene thioethers) having predominant recurring units of the formula

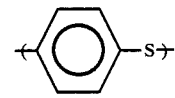

(hereinafter abbreviated as "PATEs"; said recurring units accounting for at least 50 wt. %) are preferred, because the poly(arylene thioethers) have good compatibility with the PTK and their blending can provide molded or formed articles which have mechanical properties improved over those obtained from the PTK alone and also heat resistance improved over those obtained from the PATEs alone and are well-balanced in heat resistance, mechanical properties and flow characteristics.

Fibrous Filler and/or Inorganic Filler:

In this invention, at least one of fibrous fillers and/or at least one of inorganic fillers may be added in a proportion up to 300 parts by weight, preferably, up to 200 parts by weight, per 100 parts by weight of the PTK as desired. If the proportion of the filler exceeds 300 parts by weight, there is a potential problem that the processability may be deteriorated to considerable extent and the physical properties of the resulting molded or formed article would be deteriorated.

As exemplary fibrous fillers usable in this invention, may be mentioned fibers such as glass fibers, carbon fibers, graphite fibers, silica fibers, alumina fibers, zirconia fibers, silicon carbide fibers and Aramid fibers; as well as whiskers such as potassium titanate whiskers, calcium silicate (including wollastonite) whiskers, calcium sulfate whiskers, carbon whiskers, silicon nitride whiskers and boron whiskers.

As exemplary inorganic fillers usable in the present invention, may be mentioned talc, mica, kaolin, clay, silica, alumina, silica-alumina, titanium oxide, iron oxides, chromium oxide, calcium carbonate, calcium silicate, calcium phosphate, calcium sulfate, magnesium carbonate, magnesium phosphate, silicon, carbon (including carbon black), graphite, silicon nitride, molybdenum disulfide, glass, hydrotalcite, ferrite, samarium-cobalt, neodium-iron-boron, etc., all, in a powder form.

Among these fillers, glass fibers and/or carbon fibers are particularly preferred from the viewpoints of physical properties and economy.

These fibrous fillers and inorganic fillers may be used either singly or in combination.

Other Optional Components:

In the present invention, it is also possible to add one or more additives such as stabilizers, rust preventives, lubricants, viscosity regulators, surface roughening agents, ultraviolet absorbents, nucleating agents, mold-releasing agents, colorants, coupling agents and/or antistatic agents, as needed.

Molded or Formed Articles

The melt-stable PTK useful in the practice of this invention is a crystalline polymer having melt stability so that conventional melt processing techniques can be applied with ease. It can therefore be processed by extrusion, injection molding and the like. By these processing techniques, heat-resistant molded and formed articles such as extruded articles, injection-molded articles and unstretched film can be obtained.

These molded and formed articles can be obtained not only from the melt-stable PTK alone but also from a composition obtained by mixing the PTK with one or more of other thermoplastic resins, fibrous fillers, inorganic fillers and the like.

Extruded articles:

An extruded article having excellent heat resistance can be obtained by shaping, in accordance with an extrusion method, a thermoplastic material which is composed of the melt-stable PTK alone or is composed of a resin composition obtained by mixing, with 100 parts by weight of the melt-stable PTK, up to 100 parts by weight, preferably up to 90 parts by weight, more preferably up to 80 parts by weight of at least one of other thermoplastic resins and/or up to 300 parts by weight, preferably 0.1–300 parts by weight, more preferably 10–200 parts by weight of at least one of fibrous fillers and/or at least one of inorganic fillers.

As the extrusion method, it may be mentioned to charge the thermoplastic material, for example, into an extruder fitted with a shaping die or nozzle in the air or preferably, an inert gas atmosphere and then to extrude and shape it at a cylinder temperature of 320°–450° C. for an average residence time of the resin in the cylinder of 0.5–60 minutes, more preferably, 2–3 minutes, and if necessary, to anneal the thus extruded material at 200°–370° C. for 0.1–100 hours. By this extrusion method, an extrusion article can be obtained suitably.

Incidentally, the extruder used here may preferably be made of a nonferrous corrosion-resistant material at portions where it is brought into contact with a molten resin. It is also preferred that the extruder is vented.

For extruded articles, it is preferable to use a composition mixed with the above-mentioned fibrous filler and/or inorganic filler.

The extruded articles according to the present invention have the following physical properties and are hence excellent in both heat resistance and strength.

(a) density of poly(arylene thioether-ketone) portions being at least 1.34 g/cm$^3$ at 25° C.;

(b) heat distortion temperature being at least 135° C. under 18.6 kg/cm$^2$ load (ASTM-D648);

(c) tensile strength being at least 5 kg/mm$^2$ at 23° C. (ASTM-D638);

(d) tensile modulus being at least 100 kg/mm$^2$ at 23° C. (ASTM-D638); and (e) Izod impact strength being at least 5 kg·cm/cm at 23° C. (ASTM-D256, unnotched).

Incidentally, the density (25° C.) of PTK portions is measured in the following manner.

Where the thermoplastic material as the raw material of the molded article is composed of the PTK alone, the density (25° C.) of PTK portions is the same as the density (25° C.) of the extruded article. Where the thermoplastic material contains the filler in addition to the PTK, the density of PTK portions is determined in accordance with the following equation from the densities of the filler and extruded article. Where the thermoplastic material contains both thermoplastic resin and filler in addition to the PTK, the density of PTK portions is determined in accordance with the following equation from the density of a sample obtained separately under the same conditions for the production of the extruded article by using the same thermoplastic material except for the omission of the PTK and also from the density of the extruded article.

$$\text{Density of the extruded article} = 1 \Big/ \left\{ \frac{\text{Weight fraction of } PTK \text{ portions}}{\text{Density of } PTK \text{ portions}} + \frac{1 - (\text{Weight fraction of } PTK \text{ portions})}{\text{Density of sample free of } PTK \text{ (or filler)}} \right\}$$

An injection-molded article having excellent heat resistance can be obtained by shaping, in accordance with an injection molding method, a thermoplastic material which is composed of the melt-stable PTK alone or is composed of a resin composition obtained by mixing, with 100 parts by weight of the melt-stable PTK, up to 100 parts by weight, preferably up to 90 parts by weight, more preferably up to 80 parts by weight of at least one of other thermoplastic resins and/or up to 300 parts by weight, preferably 0.1–300 parts by weight, more preferably 10–200 parts by weight of at least one of fibrous fillers and/or at least one of inorganic fillers.

The injection-molded article may be produced by charging the thermoplastic material, for example, into an injection molding machine fitted with a mold in the air or preferably, an inert gas atmosphere and then injection-molding it at a cylinder temperature of 320°–450° C. and a mold temperature of 50°–250° C. for an average residence time of the resin in the cylinder of 1–3,000 seconds, more preferably, 3–1,000 seconds, under an injection holding pressure of 10–10,000 kg/cm$^2$ and at an injection molding cycle of 1–3,000 seconds, and if necessary, by annealing the injection-molded material at 200°–370° C. for 0.1–100 hours.

Incidentally, the injection molding machine used here may preferably be made of a nonferrous corrosion resistant material at portions where it is brought into contact with a molten resin. It is also preferred that the machine is vented.

As the fibrous filler and/or inorganic filler, the above described fillers may be used. As the fibrous filler, glass fibers and/or carbon fibers are particularly preferred from the viewpoints of physical properties and economy.

The injection-molded articles according to this invention have the following physical properties and are hence excellent in both heat resistance and strength.

(a) density of poly(arylene thioether-ketone) portions being at least 1.34 g/cm$^3$ at 25° C.;

(b) heat distortion temperature being at least 135° C. under 18.6 kg/cm$^2$ load (ASTM-D648);

(c) flexural strength being at least 5 kg/mm$^2$ at 23° C. (ASTM-D790);

(d) flexural modulus being at least 100 kg/mm$^2$ at 23° C. (ASTM-D790); and (e) Izod impact strength being at least 5 kg·cm/cm at 23° C. (ASTM-D256, unnotched).

Incidentally, the measurement method of the density of the PTK portions (25° C.) is the same as that described before with respect to the extruded article.

Unstretched films:

An unstretched film having excellent heat resistance can be obtained by melt-forming, in accordance with a T-die method or hot pressing method, a thermoplastic material which is composed of the melt-stable PTK alone or is composed of a resin composition obtained by mixing, with 100 parts by weight of the melt-stable PTK, up to 100 parts by weight, preferably up to 90 parts by weight, more preferably up to 80 parts by weight of at least one of other thermoplastic resins and/or up to 200 parts by weight of at least one of fibrous fillers and/or at least one of inorganic fillers.

Described specifically, an unstretched film is obtained by charging the thermoplastic material into an extruder fitted, for example, with a T-die in the air r an inert gas atmosphere and then melt-extruding the thermoplastic material preferably at 320°–430° C. into a film (T-die extrusion), or press-forming the thermoplastic material into a film while heating and melting the thermoplastic material preferably at 320°–430° C. on a high temperature press (hot pressing), and thereafter, heat setting the resultant film for 1–3,000 seconds at a temperature of from 200° C. to a temperature just below the melting point of the PTK, preferably, in a range of 250°–330° C. while limiting its deformation within ±20% by applying a stress (pressure) and if necessary, subjecting the thus-formed film to thermal relaxation under substantially no stress at 200°–360° C. for 1–3,000 seconds. The density (25° C.) of PTK portions of the unstretched film thus obtained is at least 1.34 g/cm$^3$, and its heat resistance, dimensional stability, mechanical strength and the like have been improved.

Incidentally, when an extruder such as that equipped with a T-die is used, it is preferred that the extruder is made of a nonferrous corrosion resistant material at portions where it is brought into contact with a molten resin. It is also preferred that the machine is vented.

The unstretched films according to this invention, which usually have an average thickness of 0.5–5000 μm, preferably, 1–3000 μm, have the following excellent physical properties.

(a) density of poly(arylene thioether-ketone) portions being at least 1.34 g/cm$^3$ at 25° C.;

(b) tensile strength being at least 5 kg/mm$^2$ at 23° C. or at least 1 kg/mm$^2$ at 250° C. (ASTM-D638);

(c) tensile modulus being at least 100 kg/mm$^2$ at 23° C. or at least 5 kg/mm$^2$ at 250° C. (ASTM-D638); and (d) temperature of 10-second solder heat resistance being at least 280° C.

Incidentally, the measurement method of the density of the PTK portions (25° C.) is the same as that described before with respect to the extruded article. On the other hand, the temperature of 10-second solder heat resistance is expressed by the highest temperature of a molten solder bath at which a sample does not develop any marked external changes such as blisters, wrinkles and/or shrinkage even when the sample is dipped for 10 seconds in the molten solder bath.

Application Fields

The molded or formed articles of this invention can be used in a wide variety of fields by making effective use of their excellent properties such as heat resistance and strength.

Extruded articles can be used, for example, as sheets and plates (stampable sheets, trays, etc.), pipes and tubes (pipings for the chemical industry, pipings for warm and hot water, pipings for electric wires), coated wires, blow bottles, rods, profiles and the like.

Injection-molded articles can be used as various electronic and electric components (circuit boards, encapsulants for electronic devices, connectors, etc.), automobile components (various components installed around engines), precision parts (parts for cameras, watches, clocks and the like), plastic magnets, sliding members, and the like.

Unstretched films can be used, either in their unstretched form or after finished into stretched films, in a wide variety of fields, for example, as base films for magnetic recording materials (including films for vacuum deposition type or sputtering type and magnetic recording films of the perpendicular magnetization type), films for capacitors (including films for chip-type capacitors), printed circuit boards (including both flexible and rigid types), insulating films, printer tapes, stampable sheets, various trays, containers, etc.

ADVANTAGES OF THE INVENTION

According to the present invention, various molded or formed articles having practical physical properties, such as extruded articles, injection-molded articles and unstretched films, can be provided economically by using a novel high-density and high-crystallinity PTK having sufficient melt stability to apply conventional melt processing techniques. In view of the fact that those having poor melt stability or processability and a low density have only been disclosed as PTKs, it is an unexpected effect that molded or formed articles having excellent heat resistance and high density and strength have been obtained from a PTK by the present invention.

EMBODIMENTS OF THE INVENTION

The present invention will hereinafter be described in further detail by the following Synthesis Experiments, Examples and Comparative Examples. It should however be borne in mind that the scope of the present invention is not limited to the following Examples and Experiments.

Synthesis Experiment 1: (Synthesis of Melt-stable PTK)

A titanium-lined reactor was charged with 90 moles of 4,4'-dichlorobenzophenone (hereinafter abbreviated as "DCBP"; product of Ihara Chemical Industry Co., Ltd.), 90 moles of hydrated sodium sulfide (water content: 53.6 wt. %; product of Sankyo Kasei Co., Ltd.) and 90 kg of N-methylpyrrolidone (hereinafter abbreviated as "NMP") (water content/NMP=5.0 moles/kg). After the reactor being purged with nitrogen gas, the resultant mixture was maintained at 240° C. for 2.5 hours so as to react them. In order to apply the stabilization treatment in the final stage of the polymerization, a mixture composed of 9.0 moles of DCBP, 15 kg of NMP and 75 moles of water was added at the same temperature in the course of 1 hour. The resultant mixture was maintained further at 260° C. for 0.3 hour to react them.

The reactor was cooled, and the reaction mixture in the form of a slurry was taken out of the reactor and was then poured into about 200 l of acetone. The resultant polymer was precipitated, collected by filtration, and then washed twice with acetone and additionally twice with water. Acetone and water were removed to obtain the polymer in a wet form. The wet polymer thus obtained was dried at 80° C. for 12 hours under reduced pressure, thereby obtaining Polymer P1 as an ivory powder.

Synthesis Experiment 2: (Synthesis of Melt-stable PTK)

A titanium-lined reactor was charged with 90 moles of DCBP, 0.9 mole of p-dibromobiphenyl, 90 moles of hydrated sodium sulfide (water content: 53.6 wt. %) and 90 kg of NMP (water content/NMP =5.0 moles/kg). After the reactor being purged with nitrogen gas, the resultant mixture was maintained at 240° C. for 2.5 hours to react them. The reaction mixture in the form of a slurry was processed in the same manner as in Synthesis Experiment 1, thereby obtaining Polymer P2 as an ivory powder.

Synthesis Experiment 3: (Synthesis of Melt-stable PTK)

A titanium-lined reactor was charged with 90.9 moles of DCBP, 90 moles of hydrated sodium sulfide (water content: 53.6 wt. %) and 90 kg of NMP (water content/NMP =5.0 moles/kg). After the reactor being purged with nitrogen gas, the resultant mixture was maintained at 240° C. for 1 hour to react them. The reaction mixture in the form of a slurry was processed in the same manner as in Synthesis Experiment 1, thereby obtaining Polymer P3 as an ivory powder.

Synthesis Experiment 4: (Synthesis of Melt-stable PTK)

A titanium-lined reactor was charged with 8.865 moles of DCBP, 0.135 mole of 2,2',4,4'-tetrachlorobenzophenone, 9.0 mole of hydrated sodium sulfide (water content: 53.6 wt. %) and 9 kg of NMP (water content/NMP =5.0 moles/kg). After the reactor being purged with nitrogen gas, the resultant mixture was maintained at 240° C. for 2 hours to react them. In order to apply the stabilization treatment in the final stage of the polymerization, a mixture composed of 0.9 mole of DCBP, 1.5 kg of NMP and 7.5 moles of water was added under pressure at the same temperature over 30 minutes. The resultant mixture was maintained further at 240° C. for 1 hour to react them. After the reaction, the reaction mixture in the form of a slurry was processed in the same manner as in Synthesis Experiment 1, thereby obtaining Polymer P4 as an ivory powder.

Synthesis Experiment 5: (Synthesis of PTK with Unduly Long Polymerization Time and with the Use of Polymerization Aid)

A reactor made of SUS 316 (i.e., Stainless Steel Type 316 as specified by ASTM, the definition will hereinafter be applied) was charged with 9.09 moles of DCBP, 9.0 moles of anhydrous lithium acetate, 9.0 moles of hydrated sodium sulfide (water content: 53.6 wt. %) and 9.0 kg of NMP (water content/NMP=5.0 moles/kg). After the reactor being purged with nitrogen gas, the resultant mixture was maintained at 240° C. for 12 hours to react them. The reaction mixture in the form of a slurry was processed in the same manner as in Synthesis Experiment 1, thereby obtaining Polymer 1R as an dark yellow powder.

Synthesis Experiment 6: (Synthesis of Conventional PTK)

A reactor made of SUS 316 was charged with 10 moles of sodium sulfide nonahydrate, 5.0 l of NMP and 10 moles of lithium acetate. The resultant mixture was heated up to 200° C. under a nitrogen gas stream to remove water therefrom, whereby 1580 g of a distilled water solution containing 104 g of NMP was obtained. After cooling the reaction system to 120° C., a solution composed of 10 moles of DCBP and 0.8 l of NMP was charged (water content/NMP=1.4 moles/kg). The thus-obtained mixture was maintained, under stirring and nitrogen gas pressure, at 230° C. for 2 hours and then at 250° C. for 1 hour so as to react them. After the polymerization reaction, the reaction mixture in the form of a slurry was poured into water. A polymer thus precipitated was washed with water and acetone separately and repeatedly, and was then dried to obtain Polymer 2R as a brown powder.

A portion of Polymer 2R was heated at 250° C. for two hours in air, thereby obtaining Polymer 2CR in the form of a cured black powder.

Synthesis Experiment 7: (Synthesis of Conventional PTK)

A reactor made of SUS 316 was charged with 1.0 mole of sodium sulfide trihydrate, 800 ml of NMP and 1.0 g of sodium hydroxide. The resulting mixture was heated up to 210° C., whereby 42 g of a distilled water solution containing 3 g of NMP was distilled out. The residue was then cooled down to about 45° C. Under vigorous stirring, 1.0 mole of 4,4'-difluorobenzophenone and 0.033 mole of sodium sulfite were added (water content/NMP=0.9 mole/kg). The reaction system was pressurized to 5 atm with nitrogen gas, and the contents were maintained at 250° C. for 4 hours to polymerize them. After the reaction, the reactor was cooled down to 100° C., and the reaction mixture in the form of a slurry was taken out. The resulting polymer was separated and then washed with hot water and acetone separately and repeatedly. After sufficiently cleaning the polymer, it was dried fully to obtain Polymer 3R as a yellowish brown powder.

Synthesis Experiment 8: (Synthesis of Conventional PTK)

In exactly the same manner as in Synthesis Experiment 7 except that DCBP was used instead of 4,4′-difluorobenzophenone, Polymer 4R was obtained as a yellowish brown powder.

Incidentally, Polymers 2R, 2CR (cured form), 3R and 4R were prepared following the processes disclosed in Publications A, A, B and B respectively. They were provided as exemplary PTKs according to the prior art.

Measurement of melting points:

With respect to each of the PTKs thus obtained, the melting point, Tm was measured as an index of its heat resistance. The measurement was performed in the following manner. About 10 mg of each PTK (powder) was weighed. The sample was held at 50° C. for 5 minutes in an inert gas atmosphere and then heated up at a rate of 0° C./min so as to measure its melting point on a DSC (Model TC10A; manufactured by Mettler Company). Results are collectively shown in Table 1.

Measurement of residual melt crystallization enthalpies:

With respect to each of the PTKs polymerized above, the residual melt crystallization enthalpy, Hmc (420° C./10 min) was measured as an index of its melt stability. Namely, the temperature corresponding to a peak of melt crystallization measured by the DSC is represented by Tmc (420° C./10 min) and the amount of heat converted from the area of the peak was taken as residual melt crystallization enthalpy, $\Delta$Hmc (420° C./10 min). Described specifically, about 10 mg of each PTK (powder form) was weighed. After holding the PTK at 50° C. for 5 minutes in an inert gas atmosphere, it was heated at a rate of 75° C./min up to 420° C. and held at that temperature for 10 minutes. While cooling the PTK at a rate of 10° C./min, its $\Delta$Hmc (420° C./10 min) and Tmc (420° C./10 min) were measured. Results are collectively shown in Table 1.

Melt processing test:

With respect to each of the PTKs polymerized above, melt extrusion was conducted to investigate its melt processability, in other words, to test the long run characteristics of its melt processing. Namely, each PTK (powder) was charged under a nitrogen gas stream into a single-screw extruder which had a cylinder diameter of 40 mm and a cylinder length of 1 m and was equipped with a nozzle having a diameter of 5 mm. The PTK was molten and extruded at a cylinder temperature of 375° C. and an residence time in the cylinder of about 3 minutes. For each PTK, the time was measured from the initiation of its extrusion until its extrusion became difficult due to the increase of extrusion torque. Results are also given collectively in Table 1.

Evaluation of melt processability:

Those having at least 2 hours long-run time of melt processing were evaluated as having "good" melt processability, those having 0.5-2 hours long-run time were evaluated as having "fair" melt processability, and those having less than 0.5 hour long-run time were evaluated as having "extremely poor" melt processability. Results are also shown collectively in Table 1.

It was found from Table 1 that those having $\Delta$Hmc (420° C./10 min) of at least 10 J/g out of the PTK samples all had good processability while those having $\Delta$Hmc (420° C./10 min) smaller than 10 J/g all had poor melt processability. It has therefore been found that $\Delta$Hmc (420° C./10 min) can be used as an effective index of melt processability. In addition, Polymers 2R-4R which were conventional PTKs all had $\Delta$Hmc (420° C./10 min) smaller than 10 J/g and their melt processability was extremely poor.

TABLE 1

| | Example | | | |
|---|---|---|---|---|
| | 1 | 2 | 3 | 4 |
| Heat resistance Tm (°C.) | 366 | 365 | 360 | 350 |
| Melt stability $\Delta$Hmc (420° C./10 min) (J/g) | 56 | 43 | 48 | 47 |
| Tmc (420° C./10 min) (°C.) | 306 | 290 | 300 | 296 |
| Melt processing long-run time (hr) | >2 | >2 | >2 | >2 |
| Evaluation of melt processability | Good | Good | Good | Good |
| Remarks: Polymer No. | P1 | P2 | P3 | P4 |

| | Comparative Example Synthesis Experiment | |
|---|---|---|
| | 5 | 6 |
| Heat resistance Tm (°C.) | 363 | 335 |
| Melt stability $\Delta$Hmc (420° C./10 min) (J/g) | 0 | 0 |
| Tmc (420° C./10 min) (°C.) | ND* | ND* |
| Melt processing long-run time (hr) | <0.5 | <0.5 |
| Evaluation of melt processability | Extremely poor | Extremely poor |
| Remarks: Polymer No. | 1R Unduly long polymerization time. Polymerization aid used. | 2R Conventional PTK |

| | Comparative Example Synthesis Experiment | | |
|---|---|---|---|
| | 6 | 7 | 8 |
| Heat resistance Tm (°C.) | 331 | 365 | 363 |
| Melt stability $\Delta$Hmc (420° C./10 min) (J/g) | 0 | 0 | 0 |
| Tmc (420° C./10 min) (°C.) | ND* | ND* | ND* |
| Melt processing long-run time (hr) | <0.5 | <0.5 | <0.5 |
| Evaluation of melt processability | Extremely poor | Extremely poor | Extremely poor |
| Remarks: Polymer No. | 2CR Conventional cured PTK | 3R Conventional PTK | 4R Conventional PTK |

*ND: Not detected.

Measurements of densities and solution viscosities:

With respect to Polymers P1, P2, P3 and P4 having good melt processability and Polymer 2CR which was a conventional cured PTK, their densities were measured as indices of their crystallinity. Namely, each PTK (powder) was first of all placed between two polyimide films ("Kapton", trade mark; product of E. I. du Pont de Nemours & Co., Inc.). Using a hot press, it was preheated at 385° C. for 2 minutes and then press-formed at 385° C. for 0.5 minute. It was then quenched to obtain an amorphous sheet whose thickness was about 0.15 mm. A part of the amorphous sheet was used directly as a sample, while the remaining part was annealed at 280° C. for 30 minutes to use it as an annealed sample with an increased degree of crystallinity. Their densities were measured separately at 25° C. by means of a density gradient tube (lithium bromide/water). Results are given collectively in Table 2.

It was found from Table 2 that the density of Polymer 2CR, a conventional cured PTK, did not increase to any substantial extent even when annealed and its crystallinity was hence extremely low. As to PTK Polymers P1, P2, P3 and P4 having good melt processability, their solution viscosities (reduced viscosities, $\eta_{red}$) were measured respectively as indices of their molecular weights. Namely, each PTK sample was dissolved in 98 wt. % sulfuric acid to give a polymer concentration of 0.5 g/dl. The reduced viscosity of the resultant solution was then measured at 25° C. by means of a Ubbellohde viscometer. It was however impossible to measure the reduced viscosity of Polymer 2CR which was a cured PTK, since it was substantially insoluble in 98 wt. % sulfuric acid. Results are also shown collectively in Table 2.

TABLE 2

|  | Example | | | | Comp. Ex. |
|---|---|---|---|---|---|
|  | 1 | 2 | 3 | 4 | 6 |
| Density (25° C.) | | | | | |
| Amorphous sheet (g/cm$^3$) | 1.30 | 1.30 | 1.30 | 1.30 | 1.27* |
| Annealed sheet (g/cm$^3$) | 1.35 | 1.35 | 1.35 | 1.35 | 1.30* |
| Evaluation of crystallinity | High | High | High | High | Extremely low |
| Molecular weight, $\eta_{red}$ (dl/g) | 0.81 | 0.61 | 0.27 | 0.89 | -** |
| Remarks: Polymer No. | P1 | P2 | P3 | P4 | 2CR |

*Thermal decomposition was observed in the course of the preparation of the amorphous sheet.
**Substantially insoluble in 98 wt. % sulfuric acid.

EXAMPLE 1

(Production of Extruded Article)

One part by weight of titanium oxide powder and 1 part by weight of silica powder were mixed well in a Henschel mixer with 100 parts by weight of each of Polymers P1-P2, which were PTKs having good melt stability and good melt processability, and Polymers 1R, 2R, 2CR, 3R and 4R which were PTKs having poor melt processability, thereby obtaining resin compositions respectively.

The resin compositions were separately charged under a nitrogen gas stream into the extruder employed in the long-run test of melt processability, extruded into strands at a cylinder temperature of 375° C. and an average resin residence time in the cylinder of 3 minutes, quenched and then chopped, thereby obtaining pellets of the individual resin compositions. In the case of the resin compositions using Polymers 1R, 2R, 2CR, 3R and 4R of poor melt processability, an abrupt increase was observed in the screw torque shortly after they were charged into the extruder (probably due to crosslinking or decomposition). Useful pellets were not obtained from the resin compositions which used Polymers 1R, 2R, 2CR, 3R and 4R respectively.

Then, the nozzle of the extruder was replaced by a slit die. Pellet samples of Polymers P1-P2 were separately charged under a nitrogen gas stream, extruded into a plate-like shape at a cylinder temperature of 375° C. and an average resin residence time in the cylinder of 3 minutes, quenched and then cut, whereby plate-like extruded articles were obtained. The extruded articles thus obtained were subjected to annealing at 280° C. for 5 hours, so that extruded articles (annealed articles) were obtained. Physical properties of the extruded articles are shown in Table 3.

TABLE 3

|  | Example 1 | |
|---|---|---|
| PTK (parts by weight) | P1 100 | P2 100 |
| Filler (parts by weight) | | |
| Titanium oxide | 1 | 1 |
| Silica | 1 | 1 |
| Density of PTK portions* (25° C., g/cm$^3$) | 1.35 | 1.35 |
| Heat distortion temperature (ASTM-D648, load: 18.6 kg/cm$^2$, °C.) | 180 | 180 |
| Tensile strength (ASTM-D638, 23° C., kg/mm$^2$) | 10 | 8 |
| Tensile modulus (ASTM-D638, 23° C., kg/mm$^2$) | 220 | 250 |
| Elongation (ASTM-D638, 23° C., %) | 7 | 5 |
| Izod impact strength (ASTM-D256, 23° C., kg·cm/cm, unnotched) | 17 | 12 |

*Measured by the density gradient tube method (lithium bromide/water). Each density was calculated by using 4.0 g/cm$^3$ and 2.2 g/cm$^3$ as the densities of titanium oxide and silica articles are shown in Table 4. respectively.

EXAMPLE 2

(Production of Injection-Molded Articles)

In a tumbler blender, 65 parts by weight of glass fibers (diameter: 13 μm, length: 3 mm; "#ECS 03T-717K", trade name; product of Nippon Electric Glass Co., Ltd.) and 1.5 parts by weight of carbon fibers (diameter: 14.5 μm, length: 3 mm; "#103S", trade name; product of Kureha Chemical Industry Co., Ltd.) were mixed well with 100 parts by weight of each of Polymers P1, P2 and P3. The thus-obtained resin compositions were separately charged into the nozzle-equipped extruder in a nitrogen gas atmosphere, extruded into strands at a cylinder temperature of 375° C. and an average resin residence time in the cylinder of 3 minutes, quenched and then chopped, thereby obtaining pellets of the individual resin compositions.

The thus-obtained pellet samples were separately charged into an injection molding machine under a nitrogen gas stream and then injection-molded at a cylinder temperature of 375° C., the mold temperature of 200° C., an average resin residence time in the cylinder of 1.5 minutes or shorter, the injection holding 2 and the injection molding pressure of 1,000 kg/cm$^2$ and the injection molding cycle of about 1 minute, whereby injection-molded articles were obtained. They were annealed at 280° C. for 5 hours. Physical properties of the thus-annealed

TABLE 4

|  | Example 2 | | |
|---|---|---|---|
| PTK (parts by weight) | P1 100 | P2 100 | P3 100 |
| Filler (parts by weight) | | | |
| GF* | 65 | 65 | 65 |
| CF** | 1.5 | 1.5 | 1.5 |
| Density of PTK portions* (25° C., g/cm$^3$) | 1.35 | 1.35 | 1.35 |
| Heat distortion temperature (ASTM-D648, load: 18.6 kg/cm$^2$, °C.) | >345 | >345 | >340 |
| Flexural strength (ASTM-D790, 23° C., kg/mm$^2$) | 28 | 22 | 14 |
| Flexural modulus (ASTM-D790, 23° C., kg/mm$^2$) | 1820 | 1850 | 1500 |
| Izod impact strength (ASTM-D256, | 35 | 30 | 12 |

TABLE 4-continued

| | Example 2 |
|---|---|
| 23° C., kg·cm/cm, unnotched) | |

*Glass fibers ("#ECS 03T-717K", trade name; product of Nippon Electric Glass Co., Ltd.).
**Carbon fibers ("#103S", trade name; product of Kureha Chemical Industry Co., Ltd.).
***Measured by the density gradient tube method (lithium bromide/water). Each density was calculated by using 2.54 g/cm$^3$ and 1.65 g/cm$^3$ as the densities of the glass fibers and carbon fibers respectively.

EXAMPLE 3

(Production of Injection-Molded Articles)

In a tumbler blender, 100 parts by weight of Polymer P4 and 65 parts by weight of glass fibers (of the same type as those used in Example 2) were blended well. After obtaining pellets in the same manner as in Example 2, an injection-molded article was obtained by

| | |
|---|---|
| Density of PTK portions (25° C., g/cm$^3$) | 1.35 |
| Heat distortion temperature (ASTM-D648, load: 18.6 kg/cm$^2$, °C.) | >340 |
| Flexural strength (ASTM-D790, 23° C., kg/mm$^2$) | 24 |
| Flexural modulus (ASTM-D790, 23° C., kg/mm$^2$) | 1800 |
| Izod impact strength (ASTM-D256, 23° C., kg·cm/cm, unnotched) | 31 |

EXAMPLE 4

(Production of Injection-Molded Articles)

In a tumbler blender, Polymer P1, poly-p-phenylenethioether (hereinafter abbreviated as "PTE"; "Fortron #W214", trade name; product of Kureha Chemical Industry Co., Ltd.) and glass fibers of the same kind as those used in Example 2 were blended well at varied mixing ratios as shown in Table 5. The thus-blended compositions were separately charged into the nozzle-equipped extruder under a nitrogen gas stream, extruded into strands at a cylinder temperature of 375° C. and an average resin residence time in the cylinder of 3 minutes, quenched and then chopped, thereby obtaining pellets of the individual resin compositions.

The thus-obtained pellet samples were separately charged into the injection molding machine used in Example 2 and then injection-molded at the cylinder temperature of 375° C., the mold temperature of 170° C., an average resin residence time in the cylinder of about 5 minutes, the injection holding pressure of 1,000 kg/cm$^2$ and the injection molding cycle of about 5 seconds, whereby injection-molded articles were obtained. They were annealed at 260° C. for 5 hours. Physical properties of the thus-annealed articles are shown in Table 5.

TABLE 5

| | Example 4 | | |
|---|---|---|---|
| | | | |
| PTK (wt. %) | P1 48 | P1 36 | P1 30 |
| PTE* (wt. %) | 12 | 24 | 30 |
| Filler, GF** (wt. %) | 40 | 40 | 40 |
| Heat distortion temperature (ASTM-D648, load: 18.6 kg/cm$^2$, °C.) | 315 | 290 | 281 |
| Flexural strength (ASTM-D790, 23° C., kg/mm$^2$) | 22 | 23 | 26 |
| Flexural modulus (ASTM-D790, 23° C., kg/mm$^2$) | 1600 | 1560 | 1540 |
| Izod impact strength (ASTM-D256, 23° C., kg·cm/cm, unnotched) | 24 | 30 | 32 |

*Poly-p-phenylenethioether ("Fortron #W214", trade name; product of Kureha Chemical Industry Co., Ltd.)
**Glass fibers ("#ECS 03T-717K", trade name; product of Nippon Electric Glass Co., Ltd.).

EXAMPLE 5

(Production of Unstretched Film)

Under a nitrogen gas stream, Polymers P1 and P2 were separately charged into a small extruder equipped with a T-die, melt-extruded at the cylinder temperature of 375° C. and the average resin residence time in the cylinder of 3 minutes and then quenched by a cooling roll, thereby producing amorphous films having an average thickness of 150 μm.

In the above operation, the temperature of the cooling roll was 50° C., the gap setting between the tip of the T-die and the cooling roll was about 1 cm, and the flow rate of resin- from the tip of the T-die was 30 cm/min.

Portions of the thus-obtained amorphous films were separately held between polyimide films ("Kapton", trade mark; product of E. I. du Pont de Nemours & Co., Inc.). Using a hot press, they were separately subjected to heat set at 310° C. for 5 minutes under pressure, followed by thermal relaxation at 290° C. for 5 minutes without pressure. Physical properties of the thus-obtained unstretched films are shown in Table 6.

TABLE 6

| | Example 5 | |
|---|---|---|
| PTK (wt. %) | P1 100 | P2 100 |
| Density of PTK portions* (25° C., g/cm$^3$) | 1.35 | 1.35 |
| Tensile strength (ASTM-D638, kg/mm$^2$) | | |
| 23° C. | 14 | 8 |
| 250° C. | 4.1 | 2.0 |
| Tensile modulus (ASTM-D638, kg/mm$^2$) | | |
| 23° C. | 300 | 300 |
| 250° C. | 33 | 32 |
| Solder heat resistance (°C.) (dipped 10 seconds in a bath of molten solder) | >310 | >310 |

*Measured by the density gradient tube method (lithium bromide/water).

EXAMPLE 6

(Production of Unstretched Film)

Polymer P1 and PTE were blended at weight ratios of 80:20 and 60:40 separately. The resultant blends were separately formed into amorphous films having an average thickness of 150 μm in the same manner as in Example 5. Following the procedure of Example 5, the thus-obtained amorphous films were subjected to heat set at 305° C. for 5 minutes under pressure, followed by thermal relaxation at 300° C. for 5 minutes. The solder heat resistance of the resultant unstretched films are given in Table 7. They were hence found to be excellent in solder heat resistance.

TABLE 7

| | | |
|---|---|---|
| PTK (wt. %) | 80 | 60 |
| PTE (wt. %) | 20 | 40 |
| Solder heat resistance (°C.) (dipped for 10 seconds in a bath | 315 | 300 |

EXAMPLE 7

(Production of Unstretched Film)

Following the procedure of Example 1, 50 parts by weight of talc and 50 parts by weight of calcium carbonate powder were blended with 100 parts by weight of Polymer P1 and the resultant composition was formed into pellets.

The resultant pellets were processed by T-die extrusion in the same manner as in Example 5, thereby obtaining a film whose thickness was 0.2 mm. The film was heat set at 335° C. and then thermally relaxed at 330° C. in the same manner as in Example 5. The thus-obtained unstretched film had solder heat resistance of at least 335° C. and was hence superb in heat resistance.

We claim:

1. A molded or formed poly(arylene thioether-ketone) article made of a thermoplastic material which comprises:
   (A) 100 parts by weight of a melt-stable poly(arylene thioether-ketone) having predominant recurring units of the formula

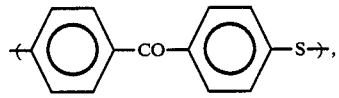

wherein the —CO— and —S— are in the para position to each other, and having the following physical properties (a)-(c):
   (a) melting point, Tm being 310°–380° C.;
   (b) residual melt crystallization enthalpy, ΔHmc 420° C./10 min) being at least 10 J/g, and melt crystallization temperature, Tmc (420° C./10 min) being at least 210° C., wherein Δ Hmc (420° C./10 min) and Tmc (420° C./10 min) are determined by a differential scanning colorimeter at a cooling rate of 10° C./min, after the poly(arylene thioether-ketone) is held at 50° C. for 5 minutes in an inert gas atmosphere, heated to 420° C. at a rate of 75° C./min and then held for 10 minutes at 420° C.; and
   (c) reduced viscosity being 0.2–2 dl/g as determined by viscosity measurement at 25° C. and a polymer concentration of 0.5g/dl in 98 percent by weight sulfuric acid; and optionally,
   (B) at least one component selected from (i) up to 100 arts weight of at least one thermoplastic resin and (ii) up to 300 parts by weight of at least one filler selected from fibrous fillers nd inorganic fillers.

2. The article as claimed in claim 1, wherein the poly(arylene thioether-ketone) has a density of at least 1.34 g/cm$^3$ at 25° C. when annealed at 280° C. for 30 minutes.

3. The article as claimed in claim 1, wherein the poly(arylene thioether-ketone) is an uncured polymer.

4. The article as claimed in claim 1, wherein the poly(arylene thioether-ketone) is a polymer with at least some structure selected from crosslinked structure and branched structure introduced therein.

5. The article as claimed in claim 1, wherein the thermoplastic material is substantially free of said at least one of the thermoplastic resins.

6. The article as claimed in claim 1, wherein said at least one of the thermoplastic resins is a poly(arylene thioether) having predominant recurring units of the formula

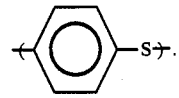

7. The article as claimed in claim 1, wherein the thermoplastic material contains 0.1–300 parts by weight of at least one filler selected from fibrous fillers and inorganic fillers.

8. The article as claimed in claim 7, wherein said at least one of the fibrous fillers is selected from glass fibers and carbon fibers.

9. The article as claimed in claim 1, wherein the article is an extruded article.

10. The article as claimed in claim 9, wherein the extruded article has the following physical properties (a)-(e):
    (a) density of poly(arylene thioether-ketone) portion being at least 1.34 g/cm$^3$ at 25° C.;
    (b) heat distortion temperature being at least 135° C. under 18.6 kg/cm$^2$ load;
    (c) tensile strength being at least 5 kg/mm$^2$ at 23° C.;
    (d) tensile modulus being at least 100 kg/mm$^2$ at 23° C.; and
    (e) Izod impact strength (unnotched) being at least 5 kg·cm/cm at 23° C.

11. The article as claimed in claim 1, wherein the article is an injection-molded article.

12. The article as claimed in claim 11, wherein the injection-molded article has the following physical properties (a)-(e):
    (a) density of poly(arylene thioether-ketone) portions being at least 1.34 g/cm$^3$ at 25° C.;
    (b) heat distortion temperature being at least 135° C. under 18.6 kg/cm$^2$ load;
    (c) flexural strength being at least 5 kg/mm$^2$ at 23° C.;
    (d) flexural modulus being at least 100 kg/mm$^2$ at 23° C.; and
    (e) Izod impact strength (unnotched) being at least 5 kg·cm/cm at 23° C.

13. The article as claimed in claim 1, wherein the article is an unstretched film.

14. The article as claimed in claim 13, wherein the unstretched film has been obtained by melt-forming, into a film-like configuration, a thermoplastic material composed of 100 parts by weight of the melt-stable poly(arylene thioether-ketone) and optionally, the at least one component selected from (i) up to 100 parts by weight of the at least one thermoplastic resin and (ii) up to 200 parts by weight of the at least one filler selected from fibrous fillers and inorganic fillers.

15. The article as claimed in claim 13, wherein the unstretched film has the following physical properties (a)-(d):
    (a) density of poly(arylene thioether-ketone) portions being at least 1.34 g/cm$^3$ at 25° C.;
    (b) tensile strength being at least 5 kg/mm$^2$ at 23° C. or at least 1 kg/mm$^2$ at 250° C.;

(c) tensile modulus being at least 100 kg/mm² at 23° C. or at least 5 kg/mm² at 250° C.; and
(d) temperature of 10-second solder heat resistance being at least 280 C.
16. The article as claimed in claim 14, wherein the unstretched film contains, as at least one of the thermoplastic resins, a poly(arylene thioether) having predominant recurring units of the formula
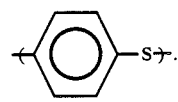
* * * * *